(12) United States Patent
Yuan

(10) Patent No.: US 10,657,243 B2
(45) Date of Patent: May 19, 2020

(54) VARIATION ANALYSIS-BASED PUBLIC TURING TEST TO TELL COMPUTERS AND HUMANS APART

(71) Applicant: Jingxia Yuan, Chongqing (CN)

(72) Inventor: Jingxia Yuan, Chongqing (CN)

( * ) Notice: Subject to any disclaimer, the term of this patent is extended or adjusted under 35 U.S.C. 154(b) by 203 days.

(21) Appl. No.: 15/605,945

(22) Filed: May 25, 2017

(65) Prior Publication Data

US 2018/0253542 A1    Sep. 6, 2018

(30) Foreign Application Priority Data

Mar. 2, 2017    (CN) .......................... 2017 1 0121648

(51) Int. Cl.
  *G06F 21/00*    (2013.01)
  *G06F 21/36*    (2013.01)
  *G06F 21/41*    (2013.01)

(52) U.S. Cl.
  CPC .............. *G06F 21/36* (2013.01); *G06F 21/41* (2013.01); *G06F 2221/2133* (2013.01)

(58) Field of Classification Search
  CPC ... G06F 21/36; G06F 21/41; G06F 2221/2133
  See application file for complete search history.

(56) References Cited

U.S. PATENT DOCUMENTS

| | | | | |
|---|---|---|---|---|
| 2011/0300831 A1* | 12/2011 | Chin | ...................... | G06F 1/3203 455/411 |
| 2013/0347087 A1* | 12/2013 | Smith | ...................... | G06F 21/36 726/7 |

* cited by examiner

*Primary Examiner* — Joseph P Hirl
*Assistant Examiner* — Ka Shan Choy
(74) *Attorney, Agent, or Firm* — Hemisphere Law, PLLC; Zhigang Ma

(57) ABSTRACT

The present invention shows a gesture verification method, network gesture verification system and verification method. The gesture verification method includes the following steps: S1. A system gives an image containing a randomly generated reference trajectory and presets a minimal match degree; S2. Displaying the image to the user; S3. The user draws an resemblant trajectory to match the reference trajectory; S4. Scaling the resemblant trajectory to adapt to the size of the reference trajectory. S5. Matching the scaled resemblant trajectory with the reference trajectory, if the match degree is lower than the minimal match degree, the verification fails; if the match degree is equal to or higher than the minimal match degree, the verification succeeds. The present invention (VAPTCHA) is safer and more user-friendly than the existing CAPTCHAs, which can be applied to PCs, mobile phones and other embedded devices.

4 Claims, 5 Drawing Sheets

VARIATION ANALYSIS-BASED PUBLIC TURING TEST TO TELL COMPUTERS AND HUMANS APART

CROSS REFERENCE

The present application is based on, and claims priority from, Chinese application number CN201710121648.8, filed on Mar. 3, 2017, the disclosure of which is hereby incorporated by reference herein in its entirety.

TECHNICAL FIELD

The invention relates to the technical field of verification, and particularly to a gesture verification method, network gesture verification system and verification method.

BACKGROUND

CAPTCHA was invented to prevent automated access to a system by compute programs or bots, it is also used to try and prevent spamming in other services such as emails or blogs Traditional form of CAPTCHA requires that users type the letters of a distorted image, sometimes with the addition of an obscured sequence of letters or digits that appears on the screen. However, some bots can still manage to break even the most powerful CAPTCHA, traditional CAPTCHAs have received increasing criticisms from people who feel that their everyday work is slowed down by distorted words that are difficult to read, "unfathomably impossible for humans" as they say. Thus, the internet calls for a safer, more efficient verification system—VAPTCHA.

SUMMARY OF THE INVENTION

The first objective of the present invention is to provide a gesture verification method which is safer, more efficient and more user-friendly than traditional forms of verification method.

The second objective of the present invention is to provide a gesture verification system using the said gesture verification method.

The third objective of the present invention is to provide a gesture verification method, including the following steps:

S1. A system gives an image containing a randomly generated reference trajectory, and presets a minimal match degree;

S2. Displaying the image to the user;

S3. The user draws an resemblant trajectory to match the reference trajectory;

S4. Scaling the resemblant trajectory to adapt to the size of the reference trajectory.

S5. Matching the scaled resemblant trajectory with the reference trajectory, if the match degree is lower than the minimal match degree, the verification fails; if the match degree is equal to or higher than the minimal match degree, the verification succeeds.

Further definition of the following features:

A first feature point: draw a straight line joining the start and the end of the resemblant trajectory, the point on the resemblant trajectory which is farthest from the line is defined as the first feature point of the resemblant trajectory;

A second feature point: draw a straight line joining the start point of the resemblant trajectory and the first feature point and another line joining the first feature point and the end point of the resemblant trajectory, the point on the resemblant trajectory which is farthest from the both lines is defined as the second feature point of the resemblant trajectory;

The specific execution method of step S4 includes the following steps:

S41. Finding out the first feature point and the second feature point of the reference trajectory, and calculating the distance L between the first feature point and the second feature point;

S42. Finding out the first feature point and the second feature point of the resemblant trajectory, and calculating the distance L' between the first feature point and the second feature point;

S43. Scaling the resemblant trajectory or the reference trajectory to the proportion of L':L.

2. Further, in step S5, the match degree is calculated using the following method: getting enough points on the reference trajectory and their corresponding resemblant points on the resemblant trajectory, calculating their match degrees, and the average of these match degrees will be the match degree of the two trajectories.

Further, in step S2, adding a background image to the reference trajectory, and adding a color bar and/or a color block touching the reference trajectory in the background image, wherein the color of the color bar and the color block is the same as the color of the reference trajectory.

Further, the reference trajectory pierces through the color bars and/or color blocks.

In order to realize the second objective of the present invention, the following technical solution is adopted:

A network gesture verification system, consisting of the following components:

A verification server, which is used to give an image containing a randomly generated reference trajectory, display the image to the client, receive the resemblant trajectory from the client, calculate the match degree of the reference trajectory and the resemblant trajectory and tell the verification result.

One or more terminal servers, which are used to receive data request from the client, ask for verification image from the verification server and send the requested data to the client when the client passes the verification;

One or more clients, which are used to request data from the terminal server and receive the request data, receive and display the verification image from the verification server, and input the resemblant trajectory drawn by users;

The terminal server is connected to the verification server and the client respectively; and the verification server is connected to the client.

In order to realize the third objective of the present invention, the following technical solution is adopted:

A network gesture verification method, consisting of the verification server, the terminal server and the client; the network gesture verification method includes the following steps:

S1. The terminal server presets a minimal match degree;

S2. The client requests data from the terminal server;

S3. The terminal server asks for a verification image from the verification server;

S4. The verification server sends a verification image containing a randomly generated reference trajectory to the client;

S5. The client displays the verification image to the user; the user inputs a resemblant trajectory in the client; and the client sends the resemblant trajectory to the verification server;

S6. The verification server matches the resemblant trajectory with the reference trajectory, calculates the match degree, determines whether the client passes the verification, and sends the verification result to the client when the client passes the verification;

S7. The terminal server detects whether the verification succeeds or not; the step S8 will be executed when the verification fails; the step S9 will be executed when the verification passes.

S8. The terminal server determines that the verification fails;

S9. The terminal server determines the verification passes, and sends the data to the client as requested.

Further, the verification server configures a terminal public key and a terminal private key for each terminal server;

In step S3, the terminal server sends the terminal public key to the verification server;

The method includes a step S31 between steps S3 and S4;

S31. The verification server detects whether the terminal public key exists; if yes, the step S4 will be executed.

Further, the specific execution method of step S4 is as follows:

S41. The verification server generates and stores a unique verification challenge ID, and sends the verification challenge ID to the terminal server;

S42. The terminal server encrypts the verification challenge ID and the terminal private key to generate a first key, and stores the first key;

S43. The terminal server sends the verification challenge ID to the client; and the client sends the verification challenge ID and a verification request to the verification server;

S44. The verification server detects whether the verification challenge ID exists; if yes, the verification server returns the trajectory verification image to the client;

The specific execution method of step S5 is as follows:

S51. The client displays the verification image containing a randomly generated reference trajectory to the user; and the user inputs the resemblant trajectory in the client;

S52. The client sends the verification challenge ID and the resemblant trajectory to the verification server;

The specific execution method of step S6 is as follows:

S61. The verification server detects whether the verification challenge ID exists; if yes, the step S62 will be executed;

S62. The verification server matches the resemblant trajectory with the reference trajectory, and calculates the match degree;

S63. The verification server compares the match degree with the preset minimal match degree; if the former is lower than the latter, the step S64 will be executed; if the former is equals to or higher than the latter, the step S65 will be executed;

S64. Determining that the verification fails;

S65. Determining that the verification succeeds, and the verification server sends the verification result to the client.

The specific execution method of step S7 is as follows:

S71. The client sends the verification challenge ID to the terminal server;

S72. The terminal server encrypts the terminal private key and the verification challenge ID from the client server to generate a second key;

S73. The verification server compares the first key with the second key, when the two keys match, the verification server sends a pass confirm to the terminal server.

Compared with existing technology, the present invention demonstrates the following advantages: 1, easy on users: unlike traditional forms of verification which require that users type the letters of a distorted image, sometimes with the addition of an obscured sequence of letters or digits that appears on the screen, VAPTCHA generates a simple reference trajectory for users to copy, which is more user-friendly; 2, strict with security: traditional forms of verification based on reading text, or other visual-perception tasks can be broken in three steps: noise reduction, thresholding (image processing) and OCR reading, while the present invention cannot be cracked in this way. 3, simple formation is one of the advantages of trajectory image, which leaves room for more vision distractions without confusing users.

BRIEF DESCRIPTION OF THE DRAWINGS

The following appended figures are used to illustrate the implementations of the present invention or technical solutions in existing technical conditions, obviously, these figures only provide description to the implementations of the present invention, furthermore, those skilled in the art can obtain other figures according to the following provided figures of the present invention without involving any inventive effort.

DETAILED DESCRIPTION OF THE INVENTION

The preferable embodiments of the present invention will be elaborated hereinafter with the figures, so that the advantages and features of the present invention can be easily understood by those skilled in the art, and the protection scope of the present invention can be defined more clearly and explicitly.

The English full name of the present invention is abbreviated as VAPTCHA (Variation Analysis-Based Public Turing Test to Tell Computers and Humans Apart).

Figure 1:
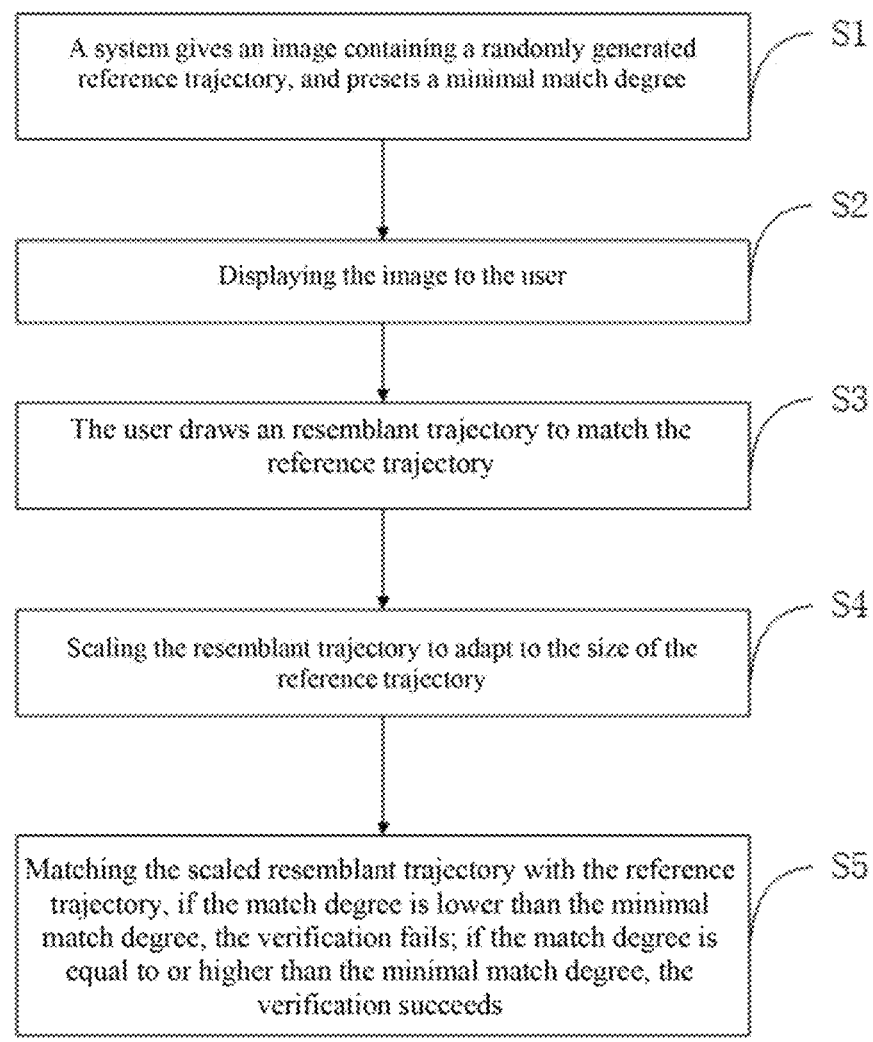
FIG. 1 is a method flow chart of the gesture verification method of the present invention.
Figure 2:
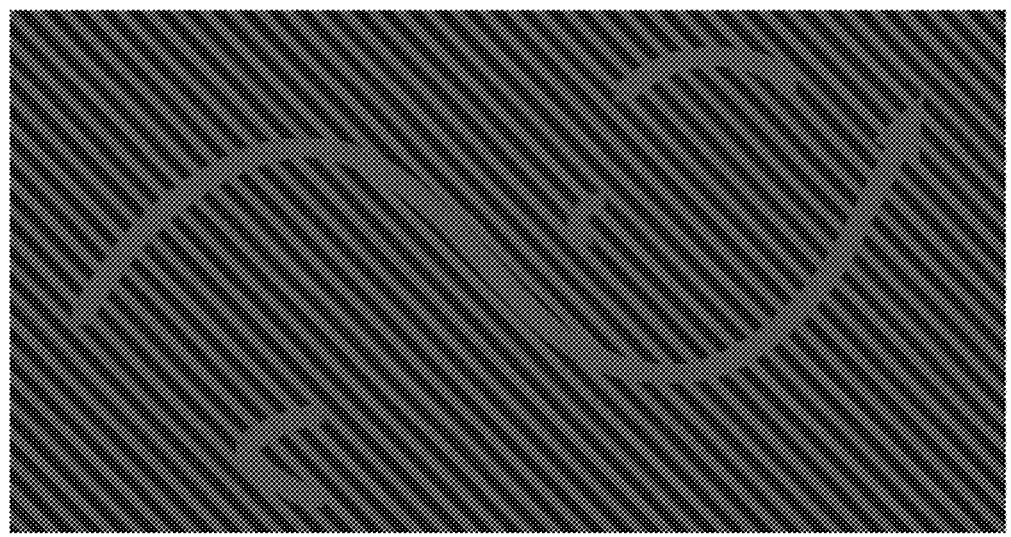
FIG. 2 is a schematic diagram of the gesture verification code of the present invention.

As presented in FIG. 1 and FIG. 2, the present invention provides a gesture verification method, including the following steps:

S1. A system gives an image containing a randomly generated reference trajectory, and presets a minimal match degree. In this step, the trajectory can be randomly generated in real-time or be drawn from the system where preset trajectories are stored. When the reference trajectory is planar, the corresponding verification image is planar; when the reference trajectory is three-dimensional, the corresponding verification image is a stereo image. The present embodiment takes a planar trajectory as an example. The reference trajectory is generally generated by a VAPTCHA server.

S2. Displaying the given trajectory to the user. In this step, the display carrier can be a display, a projector, a VR device and the like.

S3. The user draws an resemblant trajectory to match the given trajectory. In this step, the user can draw the resemblant trajectory with a mouse, a touch screen, a writing board, a VR glove or other VR devices.

S4. Scaling the resemblant trajectory to adapt to the size of the reference trajectory. In this step, the resemblant trajectory and the reference trajectory can be scaled to the same maximum length or the same maximum height S5. Matching the scaled resemblant trajectory with the reference trajectory, if the match degree is lower than the minimal match degree, the verification fails; if the match degree is equal to or higher than the minimal match degree, the verification succeeds.

With this method, the user can recognize the reference trajectory more easily and the verification process is much simpler which can be completed with an easy slide of input devices.

Figure 3:
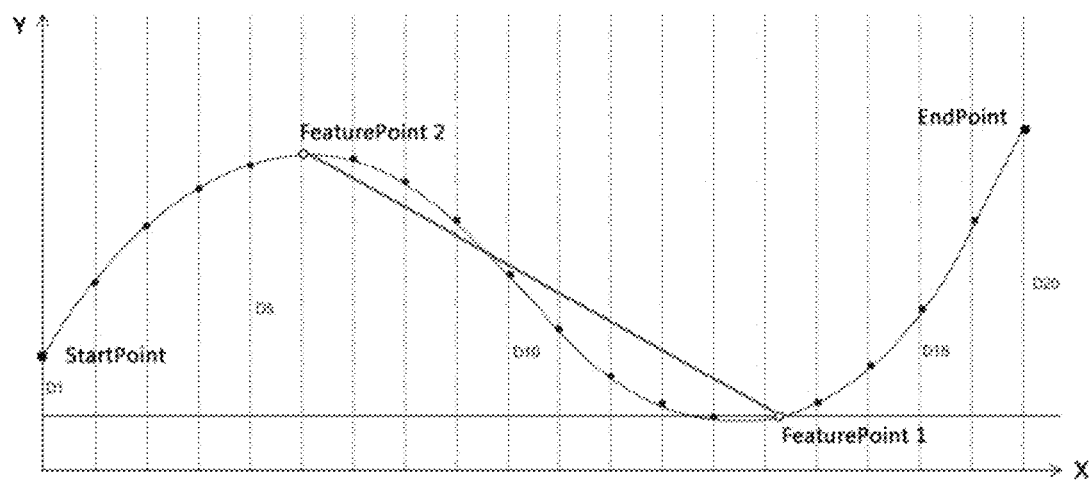
FIG. 3 is a reference schematic diagram for calculating the first feature point and the second feature point of the present invention.

In the present embodiment, in order to simplify the analysis, as shown in FIG. 3, the number of the reference trajectory is one, and the following features are defined as:

A first feature point (feature point 1): draw a straight line joining the start and the end of the resemblant trajectory, the point on the resemblant trajectory which is farthest from the line is defined as the first feature point (feature point 1) of the resemblant trajectory;

Furthermore, a second feature point (feature point 2): draw a straight line joining the start point of the resemblant trajectory and the first feature point and another line joining the first feature point and the end point of the resemblant trajectory, the point on the resemblant trajectory which is farthest from the both lines is defined as the second feature point (feature point 2) of the resemblant trajectory;

The specific execution method of step S4 includes the following steps:

S41. Finding out the first feature point (feature point 1) and the second feature point (feature point 2) of the reference trajectory, and calculating the distance L between the first feature point (feature point 1) and the second feature point (feature point 2);

S42. Finding out the first feature point (client-feature point 1) and the second feature point (client-feature point 2) of the resemblant trajectory, and calculating the distance L' between the first feature point (client-feature point 1) and the second feature point (client-feature point 2);

S43. Scaling the resemblant trajectory or the reference trajectory to the proportion of L':L.

The inflection points on the upper and lower sides at the two ends of the resemblant trajectory can also be selected as the first feature point and the second feature point, and the functions of the present invention can still be realized. If deviation occurs to the feature points, the match degree would be greatly influenced.

The reason why the start point and the end point are not used as feature points is that the deviation thereof has little influence on the change of the image as a whole.

Figure 4:
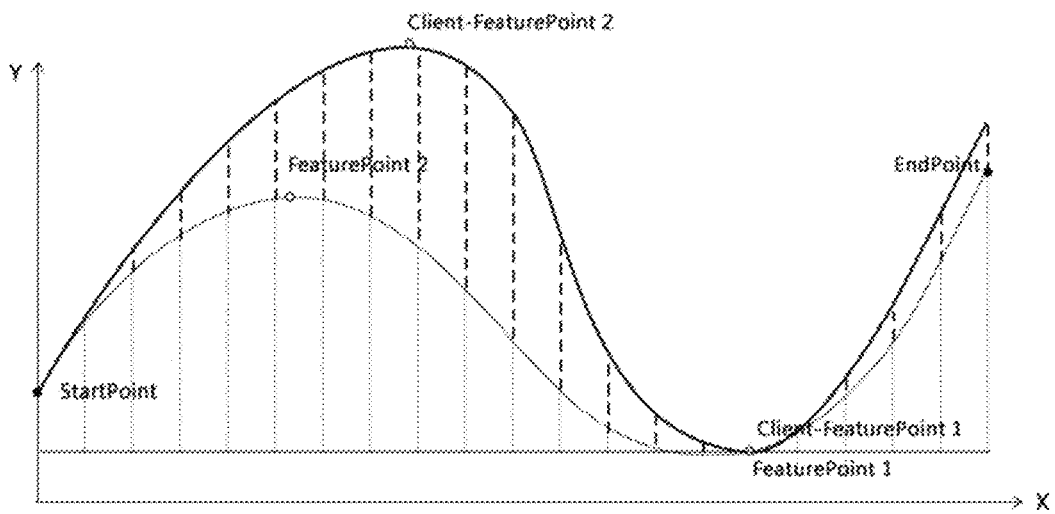
FIG. 4 a reference schematic diagram for calculating the match degree.

As shown in FIG. 3 and FIG. 4, in step S5, the match degree is calculated with the following method: getting enough points on the reference trajectory and their corresponding resemblant points on the resemblant trajectory, calculating their match degrees.

The specific execution method is as follows:

Setting a line which is in parallel with the X-axis and intersects with the feature point 1 as a reference line;

Setting a line which is in parallel with the X-axis and intersects with the client-feature point 1 as a reference line';

Along the X-axis, divide the reference trajectory into proportionally equal lengths and get N reference points, and divide the resemblant trajectory into proportionally equal lengths and get N resemblant points, these equal lengths should not be longer than 5% of the trajectories and there should be at least 20 points, if two paths should overlap, there would be two points on the involved perpendicular line. Get enough points on both the reference and the resemblant trajectories, and calculate the difference of line and line'. The difference is the distance between a corresponding point to the reference line in the direction of the Y axis.

D-feature point 1 (d1, d2, d3 . . . d20)

D-client-feature point 2 (d1', d2', d3' . . . d20')

Then calculating the absolute values of the differences between corresponding line segments, summing the absolute values, and the result is $\Sigma|d'-d|$;

$1-(\Sigma|d'-d|/\Sigma|d|)$ is the match degree V-feature point 1 of the feature point 1.

In the same way can we get the match degree V-feature point 2 of the feature point 2.

Between the V-feature point 1 and the V-feature point 2, the bigger is used as the match degree.

In another embodiment of the present invention, the method above also applies to calculate the match degree of the two trajectories in the direction of Y axis.

Figure 5:
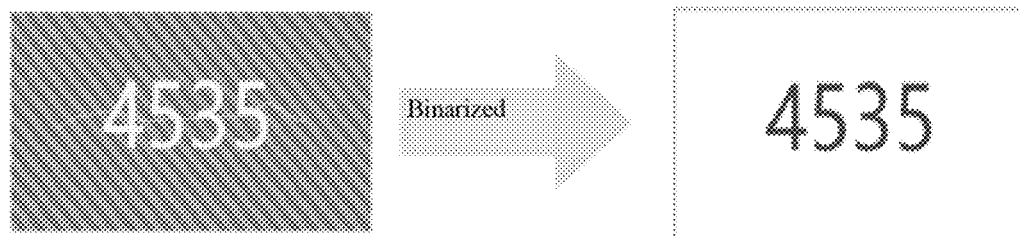
FIG. 5 is a binarized comparison diagram of the traditional verification code and the gesture verification code.
Figure 5:
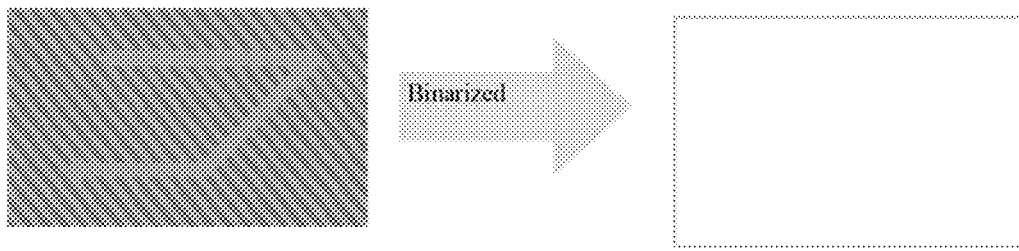

As shown in FIG. 5, in step S2, adding a background image to the reference trajectory, and adding a color bar and/or a color block touching the reference trajectory in the background image, wherein the color of the color bar and the color block is the same as the color of the reference trajectory. The added color bar and the color block are of the same color with the trajectory so as to bypass binary image process. In the present invention, the image jamming mode adopts the principle that the color of the trajectory is consistent with the color of partial background without causing trouble for people's recognition. Human brain has an abstract thinking ability that a computer does not have, so even if the trajectory is partially interrupted or contaminated by a color block of the same color, people are still able to get a complete image in their brain, therefore, cracking programs will see huge difficulty in binarization. The character-based verification is limited in the number of characters while the present invention knows no limit since all the backgrounds and trajectories are randomly generated, which means there can be infinite combinations of verification images. Above all, the present invention takes the security of verification system to a new level. Preferably, the background image is added with a plurality of parallel color bars only and they all pass through the reference trajectory, which utilizes the abstract thinking ability of human brain to recognize a trajectory image, and such is almost impossible for a robot. There is a limit to image jamming which depends on how far the human abstract thinking ability can go, the farthest place is the boundary of the jamming. Crack attempts meet more difficulty when gets nearer the boundary.

Figure 6:
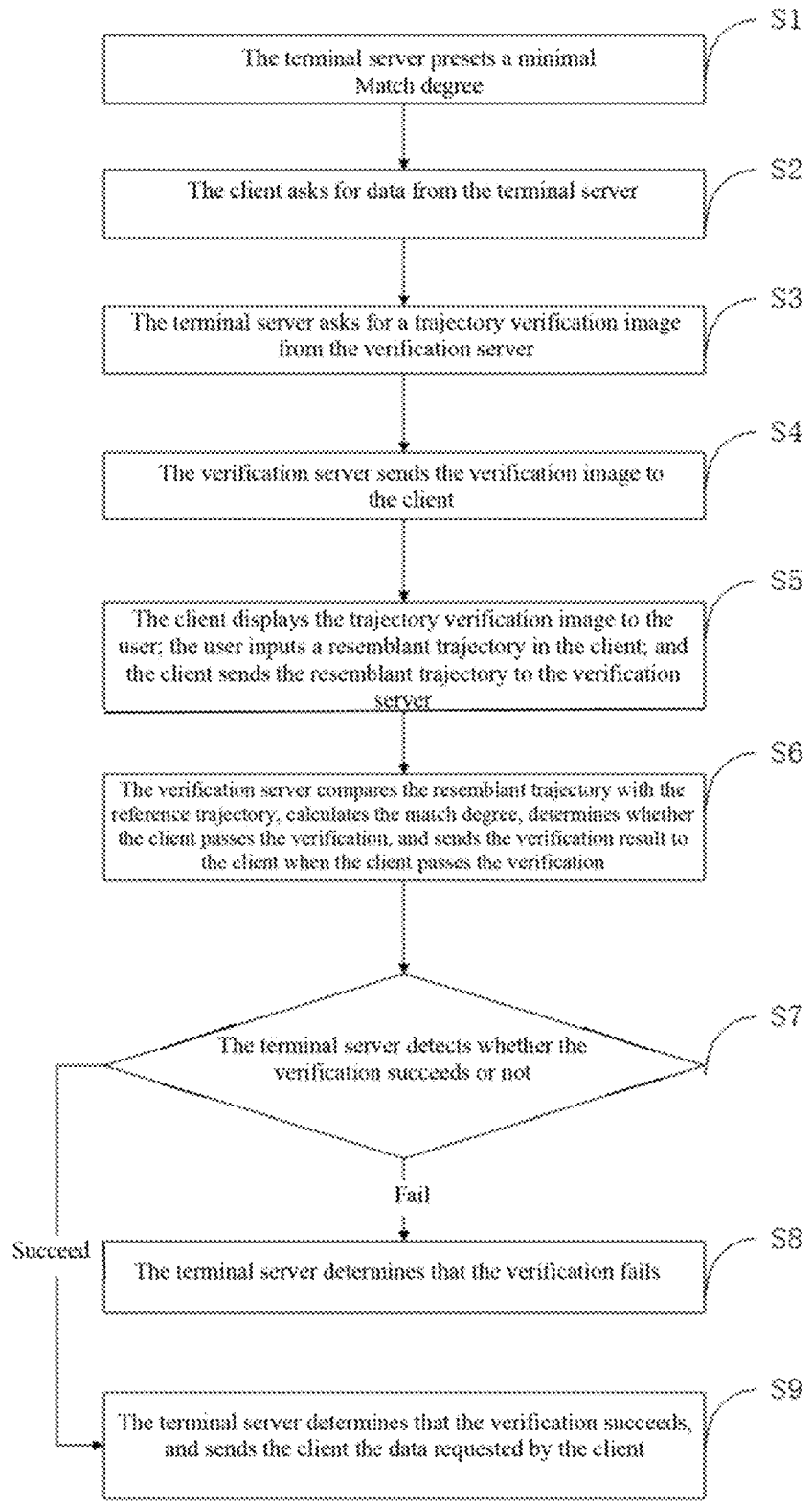
FIG. 6 is a structural schematic diagram of the gesture verification system of the present invention.

As shown in FIG. 6, the present invention provides a network gesture verification system, consisting of the following components:

A verification server, used for randomly generating a reference trajectory, forming a plurality of trajectory verification images, sending the verification images to a client, receiving a resemblant trajectory send by the client, and calculating the match degree of the two trajectories; the number of the verification server is one, but a plurality of verification servers can be configured to provide verification service for a great number of terminal servers and clients; the verification server is a VAPTCHA server.

At least one terminal server, used for receiving a data request from the client, requesting for the trajectory verification image from the verification server, and sending the requested data to the client when the client passes the verification; each terminal server or a set of terminal servers correspond to a network terminal or an APP server; and the client can access to every terminal server.

At least one client, used for asking for data from the terminal server, receiving the requested data, receiving and displaying the trajectory verification image send by the verification server, and inputting the resemblant trajectory for verification by a user; the client is controlled by each user to access to each network or the APP server.

The terminal server is connected to the verification server and the client respectively; and the verification server is connected to the client.

When performing tasks, the client asks for data from the terminal server; the terminal server asks for the verification image from the verification server; the verification server can send the verification image directly to the client, and can also send the verification image to the client via the terminal server. A user at the client inputs a resemblant trajectory with reference to the reference trajectory in the verification image; the resemblant trajectory can be verified in the verification server, and can also be verified in the terminal server. Preferably, the resemblant trajectory is send to the verification server; the verification server calculates the match degree of the two trajectories, and sends the match degree to the terminal server; the terminal server can preset a minimal match degree, for example 90%, 80% and the like, according to the requirement thereof. The terminal server compares the received match degree with the preset minimal match degree to determine whether the client pass the verification, and sends to the client the data requested by the client if the client passes the verification.

Figure 7:
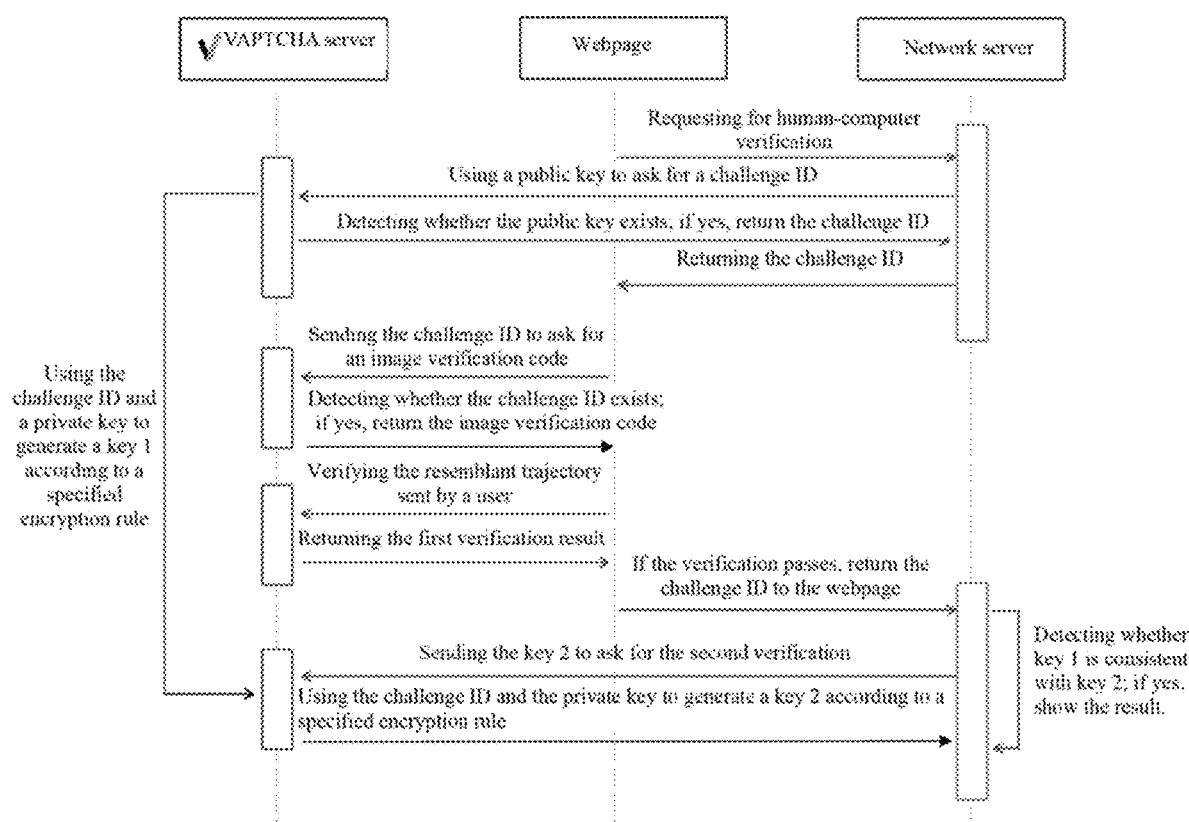
FIG. 7 is a method flow chart of the network gesture verification method of the present invention.

As shown in FIG. 7, the present invention provides a network gesture verification method, consisting of the verification server, the terminal server and the client; the network gesture verification method includes the following steps:

S1. The terminal server presets a minimal match degree; each terminal facilitator presets a minimal match degree independently and the minimal match degree of each terminal server may be different; the higher the minimal match degree is, the more difficult it is to pass the verification; the lower the minimal match degree is, the easier it is to pass the verification.

S2. The client asks for data from the terminal server;

S3. The terminal server asks for a trajectory verification image from the verification server; the verification image can be easily deployed on a to-be-verified webpage or an APP by invoking a Javascript API.

S4. The verification server sends the trajectory verification image to the client; the reference trajectory in the verification image can be invoked from a database or randomly generated, and if a background image is added it will be more difficult to be cracked by a computer.

S5. The client displays the trajectory verification image to a user; the user inputs a resemblant trajectory into the client; and the client sends the resemblant trajectory to the verification server; the user can draw the resemblant trajectory via a mouse, a touch screen, a writing board, a VR device and the like.

S6. The verification server matches the resemblant trajectory with the reference trajectory, calculates the match degree, decides whether the client passes the verification, and sends the verification result to the client if the client passes the verification;

S7. The terminal server detects whether the verification passes or not; if the verification fails, the step S8 will be executed; and if the verification passes, step S9 will be executed;

S8. The terminal server tells that the verification fails;

S9. The terminal server tells that the verification passes, and sends the client the data requested.

In the present embodiment, the verification server configures a terminal public key and a terminal private key for each terminal server; and all the terminal public keys are recorded in the verification server.

In step S3, the terminal server sends the terminal public key to the verification server.

The method includes a step S31 between steps S3 and S4;

S31. The verification server detects whether the terminal public key exists; if yes, the step S4 will be executed, which is used to provide keys for each protocol network or a protocol APP, so as to provide verification service and improve security performance.

Preferably, to identify the terminal server and the client and enable the extracted trajectory verification image to correspond to the terminal server and the client, a unique verification challenge ID is added. The specific execution method of step S4 is as follows:

S41. The verification server generates and stores a unique verification challenge ID, and sends the verification challenge ID to the terminal server;

S42. The terminal server encrypts the verification challenge ID and the terminal private key to generate a first key (key 1), and stores the first key; to facilitate the secondary verification subsequently, the encryption can adopt the MD5 encryption manner.

S43. The terminal server sends the verification challenge ID to the client; and the client sends the verification challenge ID and a verification request to the verification server;

S44. The verification server detects whether the verification challenge ID exists; if yes, then the verification server returns the trajectory verification image to the client;

The specific execution method of step S5 is as follows:

S51. The client displays the trajectory verification image to the user; and the user inputs the resemblant trajectory in the client via an input device;

S52. The client sends the verification challenge ID and the resemblant trajectory to the verification server, in the present step, the client can also transmit the resemblant trajectory to the terminal server; and the terminal server executes verification.

In order to further improve encryption level, the specific execution method of step S6 is as follows:

S61. The verification server detects whether the verification challenge ID exists; if yes, the step S62 will be executed;

S62. The verification server matches the resemblant trajectory with the reference trajectory, and calculates the match degree;

S63. The verification server compares the match degree with the preset minimal match degree; if the former is lower than the latter, the step S64 will be executed; if the former is higher than or equals to the latter, the step S65 will be executed;

S64. Determining that the verification of the client fails;

S65. Determining that the verification of the client succeeds, and the verification server sends the verification result to the client.

Further, the specific execution method of step S7 is as follows:

S71. The client submits the verification result and the challenge ID together to the terminal server;

S72. The terminal server encrypts the private key and the challenge ID sent by the client server to generate a second key (key 2);

S73. the terminal server sends the key 2 to the verification server to perform a secondary verification; the verification server compares the first key (key 1) with the second key (key 2); when the two keys match, the verification server sends a pass confirm to the terminal server.

The key 1 and the key 2 are used for comparison. Only the terminal server and the verification server know the private key and the public key. In step S73, the purpose of the secondary verification is to prevent a computer cracking program from falsifying data and directly submitting the falsified data through an interface. Each challenge ID will be destroyed automatically after using to ensure that every challenge ID is unique in each verification. The present invention provides a completely novel gesture verification solution, not only remarkably increasing the security level (in another word, for an automatic program, the costs to crack the present invention are far higher than the obtained benefits), but also greatly improving user experience. The VAPTCHA server can be applied to a PC, a mobile device and an embedded device.

Although the embodiments of the present invention are provided with the accompanying drawings, the patentee can make changes and modifications within the scope of the claims. All the changes and modifications within the protection scope of the claims of the present invention shall be under the protection.

What is claimed is:

1. A gesture verification method, comprising the following steps:

S1, providing an image containing a randomly generated reference trajectory through a system and presetting a minimal match degree;

S2, displaying the image to a user;

S3, the user drawing a resemblant trajectory to match the randomly generated reference trajectory;

S4, scaling the resemblant trajectory to adapt to a size of the randomly generated reference trajectory to obtain a scaled resemblant trajectory;

S5, matching the scaled resemblant trajectory with the randomly generated reference trajectory to obtain a match degree, if the match degree is lower than the minimal match degree, the verification fails; if the match degree is equal to or higher than the minimal match degree, the verification succeeds; and the gesture verification method further comprising:

defining a first feature point and a second feature point;

wherein the first feature point is defined by drawing a straight line joining a start point and an end point of the resemblant trajectory, the point on the resemblant trajectory, farthest from the line, is defined as the first feature point of the resemblant trajectory;

the second feature point is defined by drawing a straight line joining the start point of the resemblant trajectory and the first feature point and drawing another line joining the first feature point and the end point of the resemblant trajectory, the point on the resemblant trajectory, farthest from both lines, is defined as the second feature point of the resemblant trajectory;

wherein the step S4 comprises the following steps:

S41, finding out the first feature point and the second feature point of the randomly generated reference trajectory, and calculating a distance L between the first feature point and the second feature point;

S42, finding out the first feature point and the second feature point of the resemblant trajectory, and calculating a distance L' between the first feature point and the second feature point;

S43, scaling the resemblant trajectory or the randomly generated reference trajectory to the proportion of L': L.

2. The gesture verification method according to claim 1, wherein in step S5, the match degree is calculated using the following method: getting a number of reference points on the randomly generated reference trajectory and resemblant points of the reference points on the resemblant trajectory, calculating match degrees between the reference points and the resemblant points, and an average of the match degrees will be the match degree between the randomly generated reference trajectory and the resemblant trajectory.

3. A gesture verification method, comprising the following steps:

S1, providing an image containing a randomly generated reference trajectory through a system and presetting a minimal match degree;

S2, displaying the image to a user;

S3, the user drawing a resemblant trajectory to match the randomly generated reference trajectory;

S4, scaling the resemblant trajectory to adapt to a size of the randomly generated reference trajectory to obtain a scaled resemblant trajectory; and S5, matching the scaled resemblant trajectory with the randomly generated reference trajectory to obtain a match degree, if the match degree is lower than the minimal match degree, the verification fails; if the match degree is equal to or higher than the minimal match degree, the verification succeeds;

wherein the step S2 further comprises, adding a background image to the randomly generated reference trajectory, and adding a color bar and/or a color block touching the randomly generated reference trajectory in the background image, wherein the color of the color bar and the color block is as same as the color of the randomly generated reference trajectory.

4. The gesture verification method according to claim 3, wherein the randomly generated reference trajectory pierces through the color bars and/or color blocks.

* * * * *